(12) United States Patent
van Diggelen (10) Patent No.: US 8,358,245 B2
(45) Date of Patent: Jan. 22, 2013

(54) METHOD AND SYSTEM FOR EXTENDING THE USABILITY PERIOD OF LONG TERM ORBIT (LTO)

(75) Inventor: Frank van Diggelen, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 502 days.

(21) Appl. No.: 12/326,465

(22) Filed: Dec. 2, 2008

(65) Prior Publication Data

US 2010/0134353 A1 Jun. 3, 2010

Related U.S. Application Data (63) Continuation-in-part of application No. 11/567,629, filed on Dec. 6, 2006, now abandoned, which is a continuation-in-part of application No. 11/333,787, filed on Jan. 17, 2006, now Pat. No. 7,443,340, which is a continuation-in-part of application No.

(Continued)

(51) Int. Cl.
*G01S 19/27* (2010.01)
*G01S 19/05* (2010.01)
*G01S 19/08* (2010.01)
*G01S 19/25* (2010.01)

(52) U.S. Cl. ......... 342/357.66; 342/357.42; 342/357.45; 342/357.64

(58) Field of Classification Search ............ 342/357.66, 342/357.42, 357.64, 357.55
See application file for complete search history.

(56) References Cited

U.S. PATENT DOCUMENTS

| | | |
|---|---|---|
| 4,445,118 A | 4/1984 | Taylor et al. |
| 4,894,662 A | 1/1990 | Counselman |
| 5,043,736 A | 8/1991 | Darnell et al. |
| 5,119,504 A | 6/1992 | Durboraw, III |
| 5,223,844 A | 6/1993 | Mansell et al. |
| 5,225,842 A | 7/1993 | Brown et al. |
| 5,365,450 A | 11/1994 | Schuchman et al. |
| 5,408,237 A | 4/1995 | Patterson et al. |

(Continued)

FOREIGN PATENT DOCUMENTS

| | | |
|---|---|---|
| CA | 2177310 A1 | 12/1996 |
| EP | 1 637 900 A1 | 3/2006 |

(Continued)

OTHER PUBLICATIONS

Navstar GPS Space Segment/Navigation User Interfaces, IS-GPS-200, Revision D, p. 155, Dec. 2004.*

(Continued)

*Primary Examiner* — Jack W Keith
*Assistant Examiner* — Fred H Mull
(74) *Attorney, Agent, or Firm* — Sterne, Kessler, Goldstein & Fox P.L.L.C.

(57) ABSTRACT

Aspects of a method and system for extending the usability period of long term orbit (LTO) are provided. A GPS enabled handset may receive LTO data from an AGPS server via a wireless communication network such as 3GPP or WiMAX. The GPS enabled handset may be enabled to receive broadcast GPS signals. The GPS enabled handset may extract navigation information from the received broadcast GPS signals to be used to adjust the received LTO data. The usability period of the received LTO data may be extended, accordingly. A clock model and a satellite health model associated with the extracted navigation information may be used to update or replace the clock model and/or the satellite health model of the received LTO data, respectively. A navigation solution for the GPS enabled handset may be determined more accurately based on the adjusted LTO data.

20 Claims, 5 Drawing Sheets

Related U.S. Application Data

09/993,335, filed on Nov. 6, 2001, now Pat. No. 7,053,824, which is a continuation-in-part of application No. 09/884,874, filed on Jun. 19, 2001, now Pat. No. 6,560,534, which is a continuation-in-part of application No. 09/875,809, filed on Jun. 6, 2001, now Pat. No. 6,542,820, said application No. 11/567,629 is a continuation-in-part of application No. 11/289,959, filed on Nov. 30, 2005, now Pat. No. 7,589,667, which is a continuation of application No. 10/712,807, filed on Nov. 13, 2003, now Pat. No. 6,992,617.

(56) References Cited

U.S. PATENT DOCUMENTS

| | | |
|---|---|---|
| 5,417,217 A | 5/1995 | Morita et al. |
| 5,418,537 A | 5/1995 | Bird |
| 5,430,657 A | 7/1995 | Kyrtsos |
| 5,504,492 A | 4/1996 | Class et al. |
| 5,506,781 A | 4/1996 | Cummiskey et al. |
| 5,589,833 A | 12/1996 | Randall et al. |
| 5,631,838 A | 5/1997 | Ishikawa et al. |
| 5,663,735 A | 9/1997 | Eshenbach |
| 5,673,256 A | 9/1997 | Maine |
| 5,726,893 A | 3/1998 | Schuchman et al. |
| 5,786,789 A | 7/1998 | Janky |
| 5,808,581 A | 9/1998 | Braisted et al. |
| 5,828,336 A | 10/1998 | Yunck et al. |
| 5,841,396 A | 11/1998 | Krasner |
| 5,845,227 A | 12/1998 | Peterson |
| 5,877,724 A | 3/1999 | Davis |
| 5,889,492 A | 3/1999 | Kurby et al. |
| 5,913,170 A | 6/1999 | Wortham |
| 5,917,444 A | 6/1999 | Loomis et al. |
| 5,938,721 A | 8/1999 | Dussell et al. |
| 5,943,014 A | 8/1999 | Gilhousen |
| 5,963,167 A | 10/1999 | Lichten et al. |
| 5,983,109 A | 11/1999 | Montoya |
| 5,999,124 A | 12/1999 | Sheynblat |
| 6,016,117 A | 1/2000 | Nelson, Jr. |
| 6,058,338 A * | 5/2000 | Agashe et al. .................. 701/13 |
| 6,064,336 A | 5/2000 | Krasner |
| 6,067,045 A | 5/2000 | Castelloe et al. |
| 6,067,484 A | 5/2000 | Rowson et al. |
| 6,081,229 A | 6/2000 | Soliman et al. |
| 6,084,544 A | 7/2000 | Camp, Jr. |
| 6,085,128 A | 7/2000 | Middour et al. |
| 6,097,974 A | 8/2000 | Camp, Jr. et al. |
| 6,107,960 A | 8/2000 | Krasner |
| 6,121,923 A | 9/2000 | King |
| 6,122,506 A | 9/2000 | Lau et al. |
| 6,131,067 A | 10/2000 | Girerd et al. |
| 6,133,874 A | 10/2000 | Krasner |
| 6,134,483 A | 10/2000 | Vayanos et al. |
| 6,138,074 A | 10/2000 | Gower et al. |
| 6,150,980 A | 11/2000 | Krasner |
| 6,178,195 B1 | 1/2001 | Durboraw, III et al. |
| 6,188,351 B1 | 2/2001 | Bloebaum |
| 6,204,808 B1 | 3/2001 | Bloebaum et al. |
| 6,211,819 B1 | 4/2001 | King |
| 6,215,441 B1 | 4/2001 | Moeglein et al. |
| 6,215,442 B1 | 4/2001 | Sheynblat et al. |
| 6,222,483 B1 | 4/2001 | Twitchell et al. |
| 6,239,742 B1 | 5/2001 | Krasner |
| 6,256,475 B1 | 7/2001 | Vannucci |
| 6,272,316 B1 | 8/2001 | Wiedman et al. |
| 6,285,315 B1 | 9/2001 | Pratt |
| 6,289,279 B1 | 9/2001 | Ito et al. |
| RE37,408 E | 10/2001 | Loomis et al. |
| 6,313,787 B1 | 11/2001 | King et al. |
| 6,323,804 B1 | 11/2001 | Kurby et al. |
| 6,369,751 B1 | 4/2002 | Naruse |
| 6,373,432 B1 | 4/2002 | Rabinowitz et al. |
| 6,377,585 B1 | 4/2002 | Funderburk et al. |
| 6,411,254 B1 | 6/2002 | Moeglein et al. |
| 6,411,892 B1 | 6/2002 | van Diggelen |
| 6,411,899 B2 | 6/2002 | Dussell et al. |
| 6,417,801 B1 | 7/2002 | van Diggelen |
| 6,420,999 B1 | 7/2002 | Vayanos |
| 6,424,890 B1 | 7/2002 | Syrjarinne et al. |
| 6,427,120 B1 | 7/2002 | Garin et al. |
| 6,429,808 B1 | 8/2002 | King et al. |
| 6,433,735 B1 | 8/2002 | Bloebaum et al. |
| 6,437,735 B1 | 8/2002 | McMahan |
| 6,453,237 B1 | 9/2002 | Fuchs et al. |
| 6,466,846 B2 | 10/2002 | Maynard |
| 6,542,820 B2 | 4/2003 | LaMance et al. |
| 6,560,534 B2 | 5/2003 | Abraham et al. |
| 6,636,740 B1 | 10/2003 | Ramesh |
| 6,642,884 B2 | 11/2003 | Bryant et al. |
| 6,693,882 B1 | 2/2004 | Gu et al. |
| 6,725,159 B2 | 4/2004 | Krasner |
| 6,734,821 B2 | 5/2004 | van Diggelen |
| 6,782,330 B1 | 8/2004 | Clark |
| 6,799,116 B2 | 9/2004 | Robbins |
| 6,813,560 B2 | 11/2004 | van Diggelen et al. |
| 6,826,476 B2 | 11/2004 | Ahlbrecht et al. |
| 6,829,535 B2 | 12/2004 | van Diggelen et al. |
| 6,856,282 B2 | 2/2005 | Mauro et al. |
| 6,944,541 B2 | 9/2005 | Pasturel et al. |
| 6,992,617 B2 | 1/2006 | Diggelen et al. |
| 7,020,555 B1 | 3/2006 | Janky et al. |
| 7,053,824 B2 | 5/2006 | Abraham |
| 7,158,080 B2 | 1/2007 | van Diggelen |
| 7,443,340 B2 | 10/2008 | Abraham et al. |
| 7,589,667 B2 | 9/2009 | van Diggelen et al. |
| 2002/0005802 A1* | 1/2002 | Bryant et al. ............. 342/357.01 |
| 2002/0024461 A1 | 2/2002 | Moeglein et al. |
| 2002/0032526 A1 | 3/2002 | van Diggelen |
| 2002/0049536 A1 | 4/2002 | Gaal |
| 2002/0050944 A1 | 5/2002 | Sheynblat et al. |
| 2002/0172313 A1 | 11/2002 | Smith et al. |
| 2002/0188403 A1 | 12/2002 | LaMance et al. |
| 2002/0198657 A1 | 12/2002 | Robbins |
| 2003/0023379 A1 | 1/2003 | Diggelen et al. |
| 2003/0098810 A1 | 5/2003 | Lee et al. |
| 2003/0107513 A1 | 6/2003 | Abraham et al. |
| 2003/0151547 A1 | 8/2003 | Mauro et al. |
| 2003/0212821 A1 | 11/2003 | Gillies et al. |
| 2003/0223422 A1 | 12/2003 | Igarahi et al. |
| 2004/0088111 A1 | 5/2004 | Ahlbrecht et al. |
| 2004/0117114 A1 | 6/2004 | van Diggelen |
| 2004/0203853 A1 | 10/2004 | Sheynblat |
| 2004/0203915 A1 | 10/2004 | van Diggelen et al. |
| 2004/0263386 A1 | 12/2004 | King et al. |
| 2005/0003833 A1 | 1/2005 | Younis |
| 2006/0038719 A1 | 2/2006 | Pande et al. |
| 2006/0181452 A1* | 8/2006 | King et al. ............... 342/357.02 |
| 2007/0200752 A1* | 8/2007 | van Diggelen et al. .. 342/357.01 |
| 2007/0260399 A1* | 11/2007 | Abraham et al. ............. 701/226 |
| 2008/0186229 A1 | 8/2008 | van Diggelen et al. |
| 2008/0238765 A1* | 10/2008 | Zhang et al. ............. 342/357.01 |
| 2009/0237302 A1* | 9/2009 | Derbez et al. ............ 342/357.15 |
| 2010/0134353 A1 | 6/2010 | van Diggelen |

FOREIGN PATENT DOCUMENTS

| | | |
|---|---|---|
| GB | 2307812 A | 6/1997 |
| WO | WO 89/12835 A1 | 12/1989 |
| WO | WO 98/09181 A1 | 3/1998 |
| WO | WO 99/19743 A1 | 4/1999 |
| WO | WO 99/53338 A2 | 10/1999 |
| WO | WO 99/56145 A1 | 11/1999 |
| WO | WO 00/58750 A1 | 10/2000 |
| WO | WO 00/75685 A1 | 12/2000 |
| WO | WO 01/73467 A2 | 10/2001 |
| WO | WO 01/75473 A2 | 10/2001 |
| WO | WO 03/010912 A2 | 2/2003 |

OTHER PUBLICATIONS

ETSI TS 101 528 V7.4.0 (Dec. 2001), p. 19, 2001.*
3GPP TS 25.331, 3rd Generation Partnership Project, Technical Specification Group Radio Access Network, Radio Resource Control (RRC) Protocol Specification (Release 4), V4.1.0, Jun. 2001, 810 pages.

3GPP TS 25.331, Radio Resource Control (RRC) Protocol Specification, V8.1.0, Dec. 2007, 1,471 pages.
Aparicio et al., "GPS Satellite and Payload," Global Positioning System: Theory and Applications vol. I, Progress in Astronautics and Aeronautics, vol. 163, Ch. 6, 1996, 35 pages.
Bertiger et al., "GPS precise tracking of Topex/Poseidon: Results and Implications," Journal of Geophysical Research, vol. 99, No. C12, pp. 24,449-24,464, Dec. 15, 1994, 16 pages.
Bertiger et al., "GPS precise tracking of Topex/Poseidon: Results and Implications," Submitted for Publication to JGR Topex/Poseidon Special Issue, http:1/hdl.handle.net/2014/33763, Nov. 1993, 70 pages.
Cameron et al., "Intelligent Transportation System Mayday Becomes a Reality," NAVSYS Corporation, Proceedings of the IEEE 1995 National Aerospace and Electronics Conference, NAECON 1995, 8 pages.
Chansarkar et al., "Acquisition of GPS Signals at Very Low Signal to Noise Ratio," ION NTM 2000, Anaheim, CA, Jan. 26-28, 2000, 7 pages.
European Patent Office Action in European Patent Application No. 03 799 351.6-2220, dated Aug. 18, 2005, 6 pages.
European Patent Office Action in European Patent Application No. 03 799 351.6-2220, dated Apr. 17, 2007, 6 pages.
European Search Report for European Patent Application No. 07023669.0, mailed Mar. 25, 2008, 5 pages.
International Preliminary Examination Report for International Patent Application No. PCT/US01/47053, dated Oct. 2, 2002, 3 pages.
International Preliminary Report on Patentability of International Search Authority for International Patent Application No. PCT/US2004/038117, mailed May 26, 2006, 8 pages.
International Search Report for International Patent Application No. PCT/US01/47053, mailed Jul. 24, 2002, 2 pages.
International Search Report for International Patent Application No. PCT/US02/35311, mailed Aug. 21, 2003, 2 pages.
International Search Report for International Patent Application No. PCT/US06/04422, mailed May 15, 2006, 1 page.
International Search Report for International Patent Application No. PCT/US2004/038117, mailed Apr. 18, 2005, 5 pages.
International Search Report for International Patent Application No. PCT/US2007/001187, mailed Jul. 10, 2007, 3 pages.
Written Opinion for International Patent Application No. PCT/US06/04422, dated May 15, 2006, 3 pages.
Written Opinion for International Patent Application No. PCT/US2007/001187, mailed Jul. 10, 2007, 5 pages.
Written Opinion of International Patent Application No. PCT/US2004/038117, mailed Apr. 18, 2005, 7 pages.
DiEsposti et al., "Of Mutual Benefit: Merging GPS and Wireless Communications," GPS World, vol. 9, No. 4, Apr. 1998, 7 pages.
DiEsposti et al., "The Benefits of Integrating GPS, INS and PCS," The Aerospace Corp., ION-GPS-98, 2 Session D1, Receiver Systems and Technology 1: New Receiver Architectures & Signal Processing Strategies, Nashville Convention Center, Nashville, Tennessee, Sep. 15-18, 1998, 5 pages.
Dietrich et al, "The Globalstar Cellular Satellite System," IEEE Transactions on Antennas and Propagation, vol. 46, No. 6, Jun. 1998, 8 pages.
Djuknic et al., "Geolocation and Assisted GPS", Computer vol. 34, Issue 2, Feb. 2001, 3 pages.
Enge et al., "Wide Area Augmentation System," Global Positioning System: Theory and Applications vol. II, Progress in Astronautics and Aeronautics, vol. 164, Ch. 4, 1995, 29 pages.
Expert Report of Stephen Heppe, dated Feb. 25, 2008, Regarding Invalidity of U.S. Patent Nos. 6,417,801, 6,606,346, 6,651,000, 6,704,651, 6,937,187, and 7,158,080, United States International Trade Commission Investigation No. 337-TA-602, Certain GPS Devices and Products Containing Same, 390 pages.
Fifth Supplemental Objections and Responses dated Apr. 3, 2008, by Respondents Mio Technology Limited, USA et al., to Global Locate, Inc.'s First Set of Interrogatories (Nos. 19, 21-23 and 27-28), United States International Trade Commission Investigation No. 337-TA-602, Certain GPS Devices and Products Containing Same, 145 pages.
File History of U.S. Appl. No. 10/081,164, filed Feb. 22, 2002 (now Abandoned), 218 pages.
First Amended Complaint by the Complainants, dated Feb. 8, 2008, under Section 337 of the Tariff Act of 1930, as Amended, United States International Trade Commission Investigation No. 337-TA-602, Certain GPS 45 Devices and Products Containing Same, 23 pages.
First Supplemental Corrected Notice of Prior Art by the Respondents, dated Mar. 4, 2008, United States International Trade Commission Investigation No. 337-TA-602, Certain GPS Devices and Products Containing Same, 158 pages.
First Supplemental Objections and Responses dated Aug. 24, 2007, by Respondent SiRF Technology, Inc., to Global Locate, Inc.'s First Set of Interrogatories (Nos. 22, 23 and 49) and Exhibits 23-27, United States International Trade Commission Investigation No. 337-TA-602, Certain GPS Devices and Products Containing Same, 2 pages.
First Supplemental Report of Dr. Stephen Heppe, dated Apr. 14, 2008, Regarding Invalidity of U.S. Patent Nos. 6,417,801, 6,606,346, 6,937,187 and 7,158,080, United States International Trade Commission Investigation No. 337-TA-602, Certain GPS Devices and Products Containing Same, 6 pages.
First Supplmental Responses dated Aug. 31, 2007, by Respondents Mio Technology Limited, USA et al., to Global Locate, Inc.'s First Set of Interrogatories (Nos. 22, 23 and 49) and Exhibits 23-27, United States International Trade Commission Investigation No. 337-TA-602, Certain GPS Devices and Products Containing Same, 34 pages.
Francisco, "GPS Operational Control Segment," Global Positioning System: Theory and Applications, Ch. 10, 1994, 32 pages.
Garin et al., "Wireless Assisted GPS-SiRF Architecture and Field Test Results," ION GPS '99, Nashville, TN, Sep. 14-17, 1999, 9 pages.
Gratton et al., "Orbit Ephemeris Monitors for Category I LAAS," Position Location and Navigation Symposium, 2004, 10 pages.
Hugentobler et al., "Code IGS Analysis Center Technical Report 2000", International GPS Service for Geodynamics, 2000 Technical Reports, IGS Central Bureau, Jet Propulsion Laboratory, California Institute of Technology, Pasadena, CA, Nov. 2001, 76 pages.
Initial Determination by Administrative Law Judge Carl C. Charneski, dated Nov. 25, 2008, Public Version, United States International Trade Commission Investigation No. 337-TA-602, Certain GPS Devices and Products Containing Same, 221 pages.
Johnson, "Communications Technologies for Automated Dependent Surveillance," presented at MILCOM '95, San Diego, CA, Conference Record pp. 40-44, Nov. 6, 1995, 5 pages.
LaMance et al., "Assisted GPS-Low Infrastructure Approach," GPS World, vol. 13, No. 3, Mar. 2002, 8 pages.
Makino et al., "Development of Navigation System for the Blind Using GPS and Mobile Phone Combination," 18th Annual International Conference of the IEEE Engineering in Medicine and Biology Society, Amsterdam 1996, 2 pages.
Mehaffey, "Garmin's signal strength bars: What they mean and the meaning of Warm Start, Cold Start, Auto locate and Search the Sky," gpsinformation.net/main/warmcold.htm, Jul. 12, 1999, 3 pages.
Melbourne et al., "Scientific Applications of GPS on Low Earth Orbiters," Jet Propulsion Laboratory, California Institute of Technology, Pasadena, CA, 1994, 26 pages.
Mueller et al., "1997 Technical Reports," International GPS Services for Geodynamics (IGS), IGS Central Bureau, Jet Propulsion Laboratory, California Institute of Technology, Pasadena, CA, Oct. 1998, 296 pages.
Navstar GPS Space Segment / Navigation User Interfaces, ICD-GPS-200, Jul. 3, 1991, 145 pages.
Navstar GPS, ICD-GPS-200, Revision C, Oct. 10, 1993, Oct. 13, 1995, Sep. 25, 1997, Oct. 1, 1999, Apr. 12, 2000, and Jan. 14, 2003, 198 pages.
Navstar GPS, Interface Control Document GPS (200), Jul. 1, 1992, 146 pages.
Neilan et al., "The International GPS Service: A Global Resource for GPS Applications and Research," Institute of Navigation, ION GPS-97, 10th International Technical Meeting, Kansas City, Missouri, Sep. 16-19, 1997, 6 pages.

Notice of Prior Art by the Commission Investigative Staff, dated Feb. 15, 2008, by the United States International Trade Commission Investigation No. 337-TA-602, Certain GPS Devices and Products Containing Same, 2 pages.

Notice of Prior Art by the Complainant, dated Feb. 15, 2008, Pursuant to Ground Rule 5, United States International Trade Commission Investigation No. 337-TA-602, Certain GPS Devices and Products Containing Same, 12 pages.

Notice of Prior Art dated Feb. 15, 2008, by the Respondents, United States International Trade Commission Investigation No. 337-TA-602, Certain GPS Devices and Products Containing Same, 145 pages.

Opinion dated Jan. 27, 2009, by the Commission, United States International Trade Commission Investigation No. 337-TA-602, Certain GPS Devices and Products Containing Same, 29 pages.

Rebuttal Expert Report of Phil Dafesh, dated Mar. 10, 2008, Regarding U.S. Patent Nos. 6,651,000 and 7,158,080 in Response to Expert Report of Stephen Heppe (Redacted, Non-Confidential Version), United States International Trade Commission Investigation No. 337-TA-602, Certain GPS Devices and Products Containing Same, 94 pages.

Response to European Patent Office Action mailed on Apr. 17, 2007 in European Application No. 03 799 351.6-2220, dated Aug. 5, 2007, 4 pages.

Response to European Patent Office Action mailed on Aug. 18, 2005, in European Application No. 03 799 351.6-2220, dated December 23, 2005, 12 pages.

RTCM Recommended Standards for Differential Navstar GPS Service, Version 2.0, RTCM Special Committee No. 104, RTCM Paper 134-89/SC 104-68, Jan. 1, 1990, 95 pages.

Russell, et al. "Control Segment and User Performance," Navigation: Journal of the Insitute of Navigation, vol. 25, No. 2, Summer 1978, 7 pages.

Sairo et al., "Multiple Level Integrity Monitoring in Assisted GPS." Proceedings of ION GPS 2002, Sep. 24, 2002, 6 pages.

Schenewerk et al., "Rapid Turnaround GPS Ephemerides from the National Geodetic Survey," Proceedings of the ION GPS-93, Institute of Navigation, 1993, 9 pages.

Second Supplemental Report of Dr. Stephen Heppe, dated Apr. 8, 2008, Regarding Invalidity of U.S. Patent Nos. 7,158,080, 6,651,000 and 6,704,651, United States International Trade Commission Investigation No. 337-TA-602, Certain GPS Devices and Products Containing Same, 34 pages.

Sennott, et al., "A High Performance Position Tracker for Embedded Paging, Cellular Telephone, and Law Enforcement Applications," Department of Electrical and Computer Engineering and Technology, Bradley University, Peoria, IL, IEEE, 1992, 8 pages.

SiRF v. Broadcom, U.S. Court of Appeals for the Federal Circuit, 2009-1262, decided Apr. 12, 2010, 23 pages.

Sirola, "A Method for GPS Positioning Without Current Navigation Data," Tampere University of Technology, Department of Electrical Engineering, Master Science Thesis, Oct. 17, 2001, 52 pages.

Sixth Supplemental Objections and Responses dated Apr. 13, 2008, by Respondent SiRF Technology, Inc., to Global Locate, Inc.'s First Set of Interrogatories (Nos. 19, 21-23, and 27-28), United States International Trade Commission Investigation No. 337-TA-602, Certain GPS Devices and Products Containing Same, 7 pages.

Spilker et al., "Global Positioning System: Theory and Applications, vol. I," vol. 163, Progress in Astronautics and Aeronautics, pp. 40-43 and 122-149, 1996, 33 pages.

Spilker et al., "Overview of GPS Operation and Design," Global Positioning System: Theory and Applications vol. I, Progress in Astronautics and Aeronautics, vol. 163, Ch. 2, 1996, 30 pages.

Springer et al., "1999 Analysis Center Reports", International GPS Service for Geodynamics (IGS), IGS Central Bureau, Jet Propulsion Laboratory, California Institute of Technology, Pasadena, CA, Nov. 2000, 154 pages.

Stewart, J., "Vehicle Location and Position Monitoring System Using Satellite Navigation and Cellular Telephone," IEEE Digest No. 112, 1993, 15 pages.

Sturza, Mark A. "Architecture of the Teledesic Satellite System," Teledesic Corporation, Kirkland, WA, retrieved from http://www.3csysco.com/Pubs/Architecture%20of%20the%20Teledesic%20Satellite%20System.pdf, 1995, 7 pages.

Syrjarinne, "Time Recovery through Fusion of Inaccurate Network Timing Assistance with GPS Measurements," Proc. 3rd Int. Conference on Information Fusion, Paris, France, vol. II, pp. WeD5-3-WeD5-10, Jul. 10-13, 2000, 9 pages.

Tdoc RP-030187, TSG-RAN Meeting #19, Birmingham, UK, Mar. 11-14, 2003, 20 pages.

Transcript dated May 6, 2008, of Certain GPS Devices Containing Same, USITC Inv. No. 337-TA-602, vol. 7, United States International Trade Commission, Washington, D.C. (Open Session Hearing), 167 pages.

Transcript dated May 7, 2008, of Certain GPS Devices and Products Containing Same, USITC Inv. No. 337-TA-602, vol. 8, United States International Trade Commission, Washington, D.C. (Open Session Hearing), 129 pages.

Transcript dated May 8, 2008, of Certain GPS Devices and Products Containing Same, USITC Inv. No. 337-TA-602, vol. 9, United States International Trade Commission, Washington, D.C. (Open Session Hearing), 62 pages.

Transcript dated May 9, 2008, of Certain GPS Devices and Products Containing Same, USITC Inv. No. 337-TA-602, vol. 10, United States International Trade Commission, Washington, D.C. (Open Session Hearing), 138 pages.

Transcript dated May 12, 2008, of Certain GPS Devices and Products Containing Same, USITC Inv. No. 337-TA-602, vol. 11, United States International Trade Commission, Washington, D.C. (Open Session Hearing), 113 pages.

Transcript dated May 13, 2008, of Certain GPS Devices and Products Containing Same, USITC Inv. No. 337-TA-602, vol. 12,United States International Trade Commission, Washington, D.C. (Open Session Hearing), 130 pages.

van Diggelen, "Global Locate Indoor GPS Chipset and Services," ION-GPS-2001, Salt Lake City, Utah, Sep. 11-14, 2001, 7 pages.

Wheatley, "CDMA's Dependence on Good Timing and Related Issues," 1996 IEEE International Frequency Control Symposium, Jun. 1996, 8 pages.

Yiu et al., "A Low-Cost GPS Receiver for Land Navigation," Global Positioning System, Hewlett-Packard Laboratories, Palo Alto, CA, May 1982, 17 pages.

Young, et al. "GPS Precision Orbit Determination: Measured Receiver Performance," Jet Propulsion Laboratory, California Institute of Technology, http://hdl.handle.net/2014/35887, 1993, 13 pages.

Zhao, "Efficient and Reliable Data Transmission for Cellular-and-GPS-Based Mayday Systems," IEEE, Motorola, Inc., Chicago Corporate Research Laboratories, Schaumburg, IL, 1998, 5 pages.

Zhao, "Standardization of Mobile Phone Positioning for 3G Systems," IEEE Communications Magazine, Jul. 2002, 9 pages.

Zhao, "Mobile Phone Location Determination and Its Impact on Intelligent Transportation Systems," IEEE Transactions on Intelligent Transportation Systems, vol. 1, No. 1, Mar. 2000, 10 pages.

Zumberge et al., "1996 Annual Report," International GPS Service for Geodynamics (IGS), IGS Central Bureau, Jet Propulsion Laboratory, California Institute of Technology, Pasadena, CA, Nov. 1997, 461 pages.

Zumberge et al., "Ephemeris and Clock Navigation Message Accuracy," Global Positioning System: Theory and Applications, Ch. 16, Jet Propulsion Laboratory, California Institute of Technology, Pasadena, CA, 1994, 15 pages.

* cited by examiner

METHOD AND SYSTEM FOR EXTENDING THE USABILITY PERIOD OF LONG TERM ORBIT (LTO)

CROSS-REFERENCE TO RELATED APPLICATIONS/INCORPORATION BY REFERENCE

The present application is a continuation-in-part of U.S. patent application Ser. No. 11/567,629 filed Dec. 6, 2006, now abandoned, which is a continuation-in-part application of U.S. patent application Ser. No. 11/333,787, filed Jan. 17, 2006, now U.S. Pat. No. 7,443,340, which is a continuation-in-part application of U.S. patent application Ser. No. 09/993, 335, filed Nov. 6, 2001, now U.S. Pat. No. 7,053,824, which is a continuation-in-part of U.S. patent application Ser. No. 09/884,874, filed Jun. 19, 2001, now U.S. Pat. No. 6,560,534, which is a continuation-in-part of U.S. patent application Ser. No. 09/875,809, filed Jun. 6, 2001, now U.S. Pat. No. 6,542, 820.

U.S. patent application Ser. No. 11/567,629 is also a continuation-in-part application of U.S. patent application Ser. No. 11/289,959, filed Nov. 30, 2005, now U.S. Pat. No. 7,589, 667, which is a continuation of U.S. patent application Ser. No. 10/712,807, filed 13 Nov. 2003, now U.S. Pat. No. 6,992, 617.

FIELD OF THE INVENTION

Certain embodiments of the invention relate to signal processing for communication systems. More specifically, certain embodiments of the invention relate to a method and system for extending the usability period of long term orbit (LTO).

BACKGROUND OF THE INVENTION

Global Positioning System (GPS) receivers acquire GPS radio signals from several satellites to compute position. The process of acquiring the GPS radio signal is enhanced in speed and sensitivity if a GPS receiver has prior access to a model of the satellite orbit and clock. This model is broadcast by the GPS satellites and is known as ephemeris or ephemeris data. The ephemeris is presented to receivers as part of the GPS signal or navigation message. The broadcast ephemeris comprises navigational information for the transmitting GPS satellite. The navigational information may comprise standard satellite orbits models, clock model, and/or information about the operation status of the GPS satellite (healthy or unhealthy), which may be essential for determining position and velocity of a GPS receiver.

The broadcast ephemeris is encoded within the navigation message and is transmitted at a rate of 50 bps, taking 18 seconds in all for a complete ephemeris transmission. The broadcast ephemeris is typically valid for 2 to 4 hours into the future (from the time of broadcast). Before the end of the period of validity, the GPS receiver needs to obtain a fresh broadcast ephemeris to continue operating to produce an accurate position. It is slow (no faster than 18 seconds), frequently difficult, and sometimes impossible (in environments with very low signal strengths), for a GPS receiver to download ephemeris from a satellite. For these reasons, AGPS (Assisted-GPS) technique may be used to provide ephemeris assistance data from an AGPS server to speed up the process of determining a position fix for the GPS receiver, especially in a weak signal environment. The ephemeris assistance data may be derived at the AGPS server from satellite signals collected via a plurality of reference GPS receivers. The ephemeris assistance data remains valid for only a few hours. However, the AGPS sever may be enabled to provide the GPS receiver with ephemeris assistance data valid for up to, for example, 10 days, by using Long Term Orbits (LTO) technology. The utilization of the LTO technology enables the benefits of AGPS technology even when temporarily out of mobile operator network range.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for extending the usability period of long term orbit (LTO), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
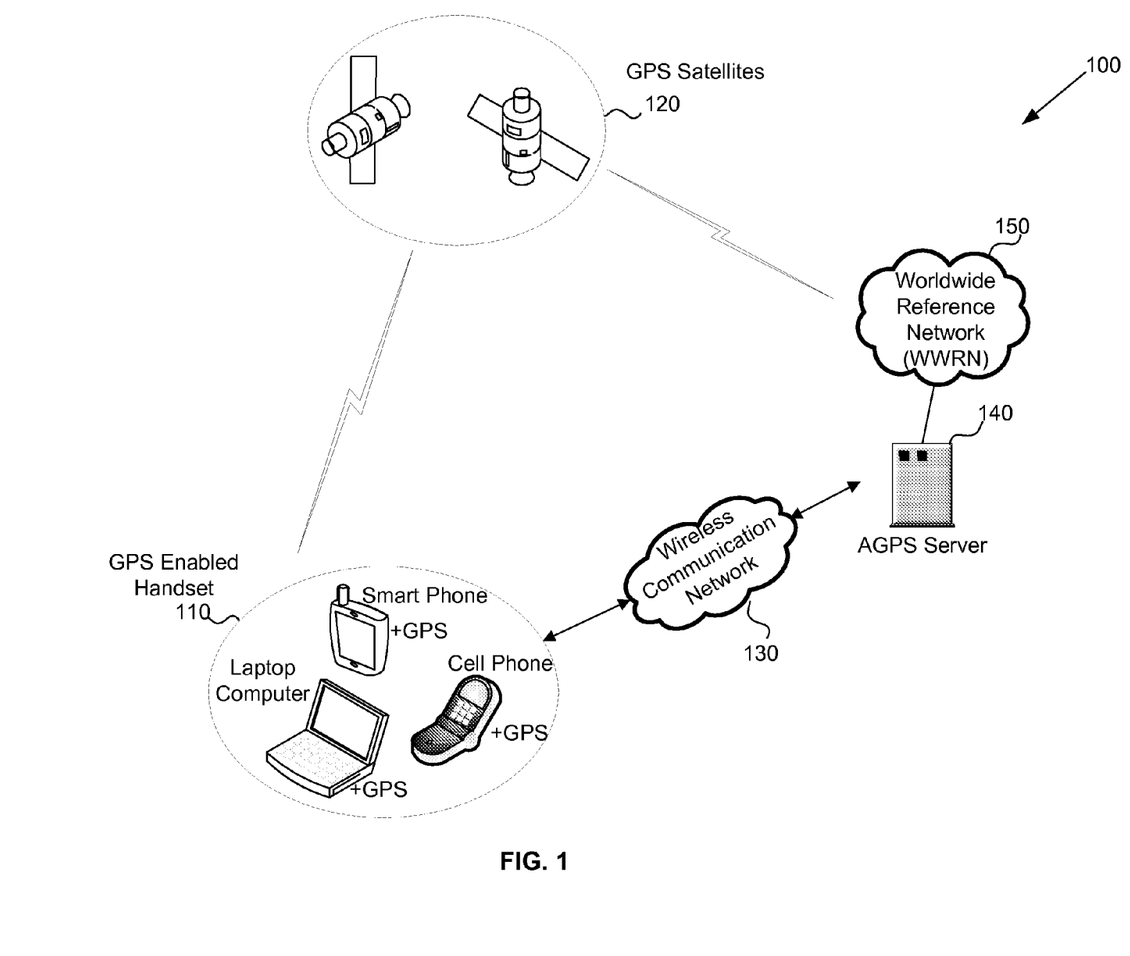
FIG. 1 is a diagram illustrating an exemplary assistance GPS satellite navigation system, in accordance with an embodiment of the invention.

Certain embodiments of the invention may be found in a method and system for extending the usability period of long term orbit (LTO). Various aspects of the invention may enable a GPS enabled handset to receive LTO data from an AGPS server for determining a navigation solution for the GPS enabled handset. The LTO data may comprise a GPS ephemeris. The GPS enabled handset may be enabled to receive broadcast GPS signals. The GPS enabled handset may be capable of adjusting the received LTO data based on navigation information from the received broadcast GPS signals. The LTO data may be transmitted from the AGPS server to the GPS enabled handset via a wireless communication network such as a network described by 3GPP, 3GPP Long Term Evolution (LTE), WiMAX. The GPS enabled handset may be enabled to extract navigation information comprising a clock model, an orbits model, and/or a health model from the received broadcast GPS signals. The usability period of the received LTO data may be extended based on the extracted navigation information. The extracted navigation information may comprise the latest GPS clock model and/or the latest satellite health model associated with the transmitting GPS satellites for the received broadcast GPS signals. The received LTO data may be adjusted based on the extracted GPS clock model and/or the extracted satellite health model, respectively. The extracted clock model may be used to update or replace the clock model of the LTO data. The extracted satellite health model may provide the latest satellite operation status to update the satellite health model of the LTO data. A navigation solution for the GPS enabled handset may be determined more accurately based on the adjusted LTO data FIG. 1 is a diagram illustrating an exemplary assistance GPS satellite navigation system, in accordance with an embodiment of the invention. Referring to FIG. 1, there is shown an AGPS satellite navigation system 100, comprising a GPS enabled handset 110, a plurality of satellites 120, a wireless communication network 130, an AGPS server 140, and a worldwide reference network (WWRN) 150.

The GPS enabled handset 110 may comprise suitable logic circuitry and/or code that may be enabled to receive satellite broadcast signals from the GPS satellites 120 to determine a position fix of the GPS enabled handset 110. The GPS enabled handset 110 may be capable of transmitting and/or receiving radio signals across the wireless communication network 130, which may be compatible with, for example, 3GPP, 3GPP2, WiFi, and WiMAX. The GPS enabled handset 110 may be enabled to acquire LTO data from the AGPS server 140 via the wireless communication network 130 for a fast position fix. The acquired LTO data may be transmitted to the GPS enabled handset 110 in a user-plan or a control-plan. The LTO data may be represented in a form of a GPS ephemeris model comprising predicted clock model, predicted orbit model, and/or predicted health model. The orbits of satellites may be affected, for example, by the gravity of the earth and the solar pressure, from being perfectly spherical to being slightly different. The orbit model may be predicted very accurately for a very long time, for example, 30 days into the future. However, the satellite clock, which may be atomic clocks, may be predicted less accurately than the orbit prediction. Actually, it may be difficult to predict the satellite clocks for a very long time, for example, more than a week in the future. The usability period of the LTO data may be shortened, accordingly. In this regard, when the GPS enabled handset 110 receives the broadcast GPS signals, the navigation information carried within the received broadcast GPS signals, for example, clock model, orbit model, and/or health model, may be extracted and may be used to adjust LTO data acquired from the AGPS server 140 to provide accurate navigation information. For example, the extracted clock model from the received broadcast GPS signals may represent the latest satellite clock information and may be used to update and/or replace the clock information inside the LTO data, accordingly. The adjusted LTO data may be used better for the future. The usability period of the adjusted LTO data may hence be extended. The adjusted LTO data may be called very long term orbit (VLTO) data.

The GPS satellites 120 may comprise suitable logic, circuitry and/or code that may be enabled to generate and broadcast suitable radio-frequency signals. The broadcast RF signals may be received by a GPS satellite receiver integrated in the GPS enabled handset 110. The received broadcast RF signals may be utilized to determine navigation information such as, for example, position, velocity, and timing information of the GPS enabled handset 110.

The wireless communication network 130 may comprise suitable logic, circuitry and/or code that may be enabled to provide various data services on a large-scale basis by using a particular technology such as GSM, UMTS, WiFi, WiMAX, or other wireless network.

The AGPS server 140 may comprise suitable logic, circuitry and/or code that may have access to a GPS reference network such as, for example, the WWRN 150, to collect GPS satellite data by tracking GPS constellations through the WWRN 150. The AGPS server 140 may be enabled to generate AGPS assistance data, which may be communicated to the GPS enabled handset 110 to compute its location. In addition, the AGPS server 140 may be enabled to use long term orbits (LTO) technology to supply ephemeris assistance data that may be valid for, for example, up to 10 days in the future. This may enable the benefits of AGPS technology to be realized by the GPS enabled handset 110 even when the GPS enabled handset 110 is temporarily out of operator network service range. The generated AGPS assistance data such as LTO data may be communicated with the GPS enabled handset 110 via the wireless communication network 130 as well as a wired communication network such as, for example, via a docking station connected to the GPS enabled handset 110.

The AGPS server 140 may communicate in various exemplary messaging formats, which may be compatible with telecommunication networks such as GSM/UMTS, WiFi, and/or WiMAX. For example, the AGPS server 140 may be GSM/UMTS standard compliant by supporting messaging in RRLP format, PCAP interface and OMA SUPLv1.0. The AGPS server 140 may be configured to deliver AGPS data to the GPS enabled handset 110 via either a user-plane or a control-plane.

The WWRN 150 may comprise suitable logic, circuitry and/or code that may be enabled to collect and distribute data for GPS satellites on a continuous basis. The WWRN 150 may comprise a plurality of GPS reference receivers located around the world to provide AGPS coverage all the time in both home network and visited network allowing users of GPS enabled devices such as the GPS enabled handset 110 to roam with their location-based services (LBS) anywhere in the world. The WWRN 150 may ensure high levels of availability, reliability, and performance.

In operation, the GPS enabled handset 110 may require AGPS assistance data from the AGPS server 140 for determining a fast position fix. The AGPS server 140 may use LTO technology to generate LTO data from GPS satellite signals collected by the WWRN 150. The generated LTO data may be passed to the GPS enabled handset 110 in either a user-plane or a control-plane via the wireless communication network 130. The GPS enabled handset 110 may use the received LTO data together with a plurality of received broadcast GPS signals to determine the actual position fix of the GPS enabled handset 110. The navigation information such as, for example, the clock model, the orbit model, and/or the health model, extracted from the received broadcast GPS signals may be used to adjust the received LTO data to provide an accurate navigation solution for the GPS enabled handset 110. The usability duration of the adjusted LTO data may be extended, accordingly.

Figure 2:
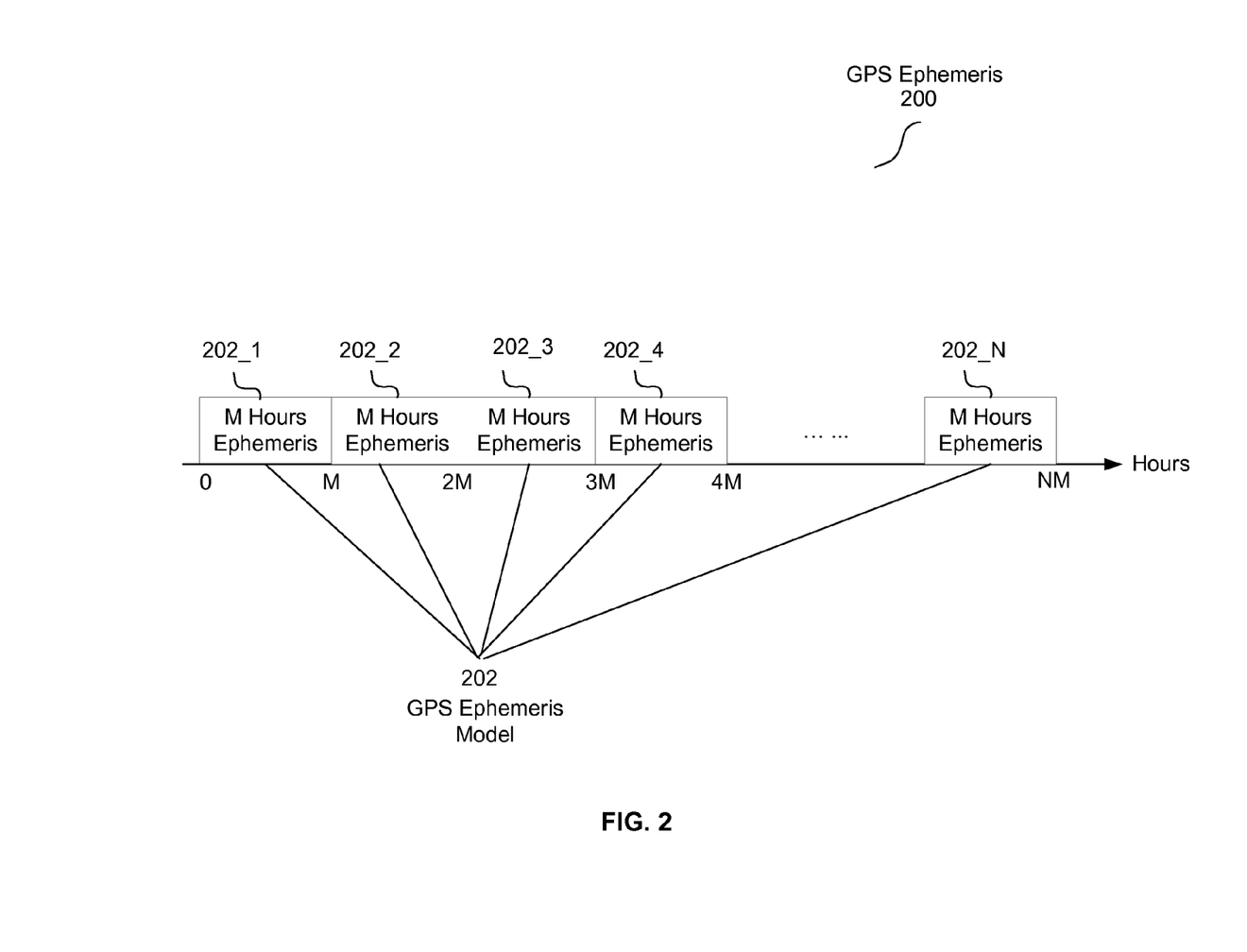
FIG. 2 is a diagram illustrating exemplary GPS ephemeris, in accordance with an embodiment of the invention.

FIG. 2 is a diagram illustrating exemplary GPS ephemeris, in accordance with an embodiment of the invention. Referring to FIG. 2, a GPS ephemeris 200 may comprise a plurality of GPS ephemeris models 202_1 through 202_N (collectively referred to as GPS ephemeris models 202), where N is an integer greater than or equal to one. Each of the GPS ephemeris models 202 is valid for a particular period of time into the future, for example, four hours. Each of the GPS ephemeris models 202 may represent ephemeris comprising an orbit model, a clock model, and/or a health model. The orbit model portion of each of the GPS ephemeris models 202 may comprise one or more of data representative of satellite positions, satellite velocities, and satellite accelerations. The clock model portion of each of the GPS ephemeris models 202 may comprise data representative of satellite clock offsets, satellite clock drifts, and/or satellite clock drift rates.

Referring to FIG. 2, the plurality of GPS ephemeris models 202_1 through 202_N are not overlapped each other. However, the invention need not be so limited. In this regard, the plurality of GPS ephemeris models may comprise partially overlapping blocks of ephemeris representing an initial ephemeris such as the GPS ephemeris model 202_1 and blocks of adjustments to the initial ephemeris as described in the 3rd Generation Partnership Project (3GPP) specification.

The AGPS server 140 may be enabled to generate AGPS ephemeris assistance data (LTO data) that may be valid for several days, 10 days, for example. The generated LTO data may be used by the GPS enabled handset 110 to determine a fast position fix for the GPS enabled handset 110. In one embodiment of the invention, the LTO data may be adjusted autonomously at the GPS enabled handset 110 based on the navigation information extracted from the received broadcast GPS signals directly from the GPS satellites 120. The usability period of the adjusted LTO data may be extended. For example, the clock model may be updated every few days in order to provide adjusted or updated LTO data that may be valid for several weeks.

Figure 3:
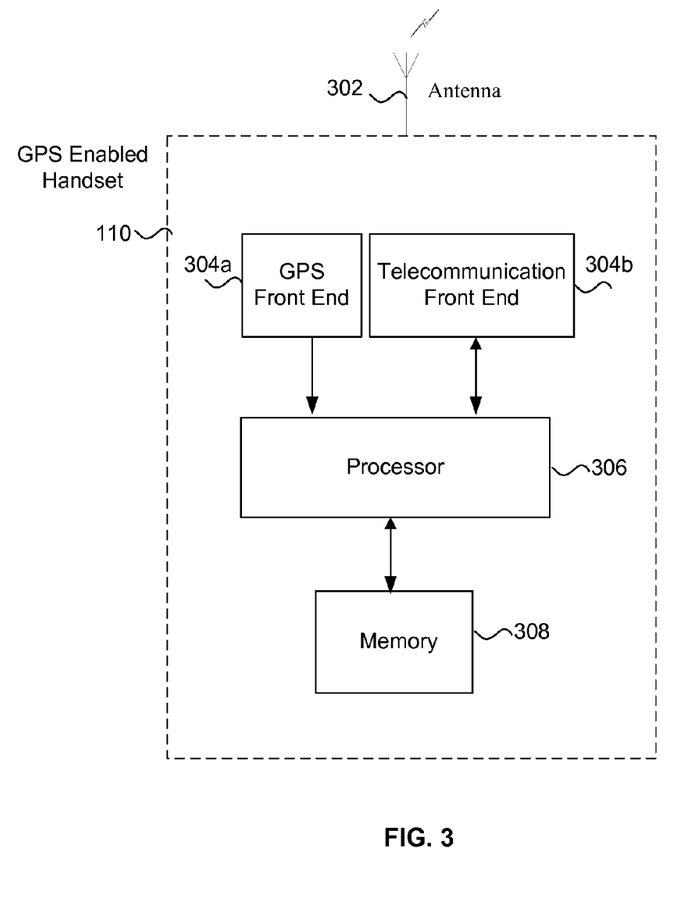
FIG. 3 is a diagram illustrating an exemplary GPS receiver, in accordance with an embodiment of the invention.

FIG. 3 is a diagram illustrating an exemplary GPS receiver, in accordance with an embodiment of the invention. Referring to FIG. 3, there is shown the GPS enabled handset 110 comprising an antenna 302, a GPS front end 304a, a telecommunication front end 304b, a processor 306, and a memory 308.

The antenna 302 may comprise suitable logic, circuitry and/or code that may be enabled to receive L band signals from a plurality of GPS satellites 120. The antenna 302 may be capable of transmitting and/or receiving radio signals over, for example, 3G radio communication system or network.

The GPS front end 304a may comprise suitable logic, circuitry and/or code that may be enabled to receive GPS satellite broadcast signals via the antenna 302. The GPS front end 304a may be operable to convert the received GPS satellite broadcast signals to GPS baseband signals, which may be suitable for further processing in the processor 306 for a navigation solution.

The telecommunication front end 304b may comprise suitable logic, circuitry and/or code that may be enabled to transmit and/or receive radio signals over a telecommunication network such as a 3G network via the antenna 302 and convert them to corresponding baseband signals, which may be suitable for further processing in the processor 306. In this regard, the received radio signals may comprise LTO data generated from the AGPS server 140 in response to an AGPS assistance data request from the GPS enabled handset 110. The received LTO data may comprise the GPS ephemeris 200 which may be good for a few days, 10 days, for instance. In this regard, the received LTO data may be adjusted autonomously whenever the navigation information such as, for example, the clock model, the orbit model, and/or the health model, extracted from the broadcast GPS signals received by the GPS front end 304a. The extracted navigation information may be used to update and/or replace the corresponding navigation information within the received LTO data. The usability period of the adjusted LTO data (called VLTO) may be extended and the adjusted LTO data may be better performed in the future.

The processor 306 may comprise suitable logic, circuitry and/or code that may be enabled to process received satellite signals as well as signals received from a telecommunication network. The processor 306 may be configured to extract navigational information from a received GPS broadcast signal to be used to determine a position fix for the GPS enabled handset 110. The processor 306 may be programmed to use the extracted navigation information from the broadcast navigation signals to adjust the received LTO data for a longer usability period. For example, in instances where the clock model in the received LTO data may be updated or replaced every few days by the latest clock model extracted from the broadcast GPS signals, then, the adjusted LTO data may be good for weeks. Similarly, the extracted health model from the broadcast navigation signals may be used to update operational status of the corresponding satellites in the received LTO data.

The memory 212 may comprise suitable logic, circuitry, and/or code that may enable storing of information such as executable instructions and data that may be utilized by the processor 306. The executable instructions may comprise algorithms that may be applied to update the LTO data by using satellite clock models and/or health data received from the broadcast navigation signals. The data may comprise GPS broadcast signal measurements and AGPS assistance data or the LTO data. The AGPS assistance data or the LTO assistance data may be from the AGPS server 140 and received through the wireless communication network 130. The memory 308 may comprise RAM, ROM, low latency non-volatile memory such as flash memory and/or other suitable electronic data storage.

In operation, a plurality of radio signals may be received at the antenna 302 coupled to the GPS enabled handset 110. The received plurality of radio signals may be measured and communicated to the GPS front end 304a or the telecommunication front end 304b, respectively, depending on the type of received radio signals. The GPS front end 304a may convert the received GPS broadcast signals into corresponding baseband signals and pass to the processor 306. The telecommunication front end 304b may convert the received telecommunication signals into corresponding baseband signals. The baseband signals may be stored in memory, where they may be accessed and processed by the processor 306. The received telecommunication signals may comprise AGPS assistance data comprising the GPS ephemeris data 200 generated from the AGPS server 140. The AGPS assistance data may represent LTO data when LTO may be enabled at the AGPS server 140. The received AGPS assistance data or the LTO data may be stored in the memory 308. In instances where new navigation information may be received and extracted from the broadcast navigation signals from the GPS satellites 120, the GPS enabled handset 110 may be enabled to adjust the received LTO data autonomously by using the extracted new navigation information. The adjusted LTO data may perform better in the future and the usability duration of the adjusted LTO data may be extended, accordingly.

Figure 4:
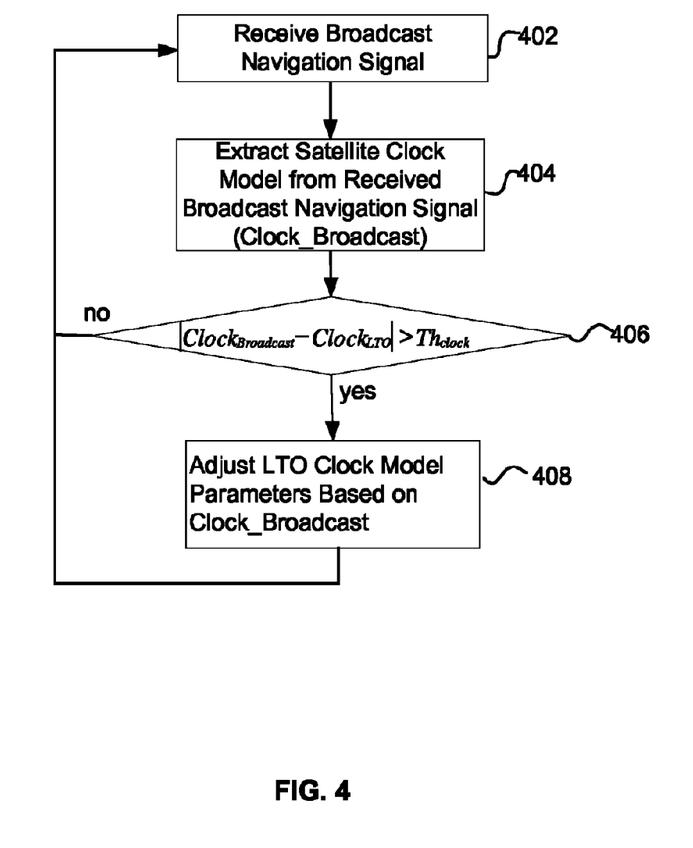
FIG. 4 is an exemplary flow chart illustrating updating of LTO data via broadcast GPS clock model, in accordance with an embodiment of the invention.

FIG. 4 is an exemplary flow chart illustrating updating of LTO data via broadcast GPS clock model, in accordance with an embodiment of the invention. Referring to FIG. 4, where the exemplary steps start with the step 402. In step 402, the GPS enabled handset 110, which may have received LTO data early and the received LTO data may be still valid, may receive broadcast navigation signals from the GPS satellites 120. In step 404, the GPS enabled handset 110 may be enabled to extract satellite clock model, indicated by clock_broadcast, from the received broadcast navigation signal. In step 406, the clock_broadcast may be compared with the clock model of the received LTO data (clock_LTO). In instances where the difference between clock_broadcast and clock_LTO may be greater than a clock threshold, Th_clock, then in step 408, the LTO clock model parameters may be adjusted based on clock_broadcast. Execution may then pass to step 402. In step 406, in instances where the difference between the clock_broadcast and the clock_LTO may be less than or equal to the clock threshold, Th_clock, then go back to step 402.

Referring to FIG. 4, the clock model in the received LTO data is adjusted based on navigation information extracted from received broadcast navigation signals. However, the invention need not be so limited. In this regard, other navigation information such as, for example, clock rate, and/or frequency, in the received LTO data may be adjusted based on corresponding navigation information extracted from the received broadcast navigation signals.

Figure 5:
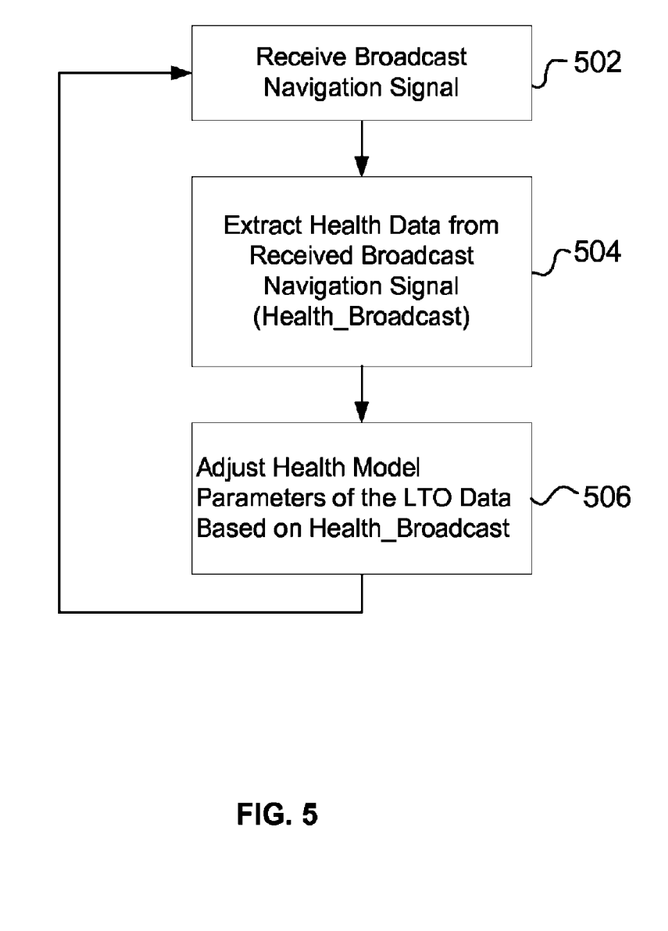
FIG. 5 is an exemplary flow chart illustrating updating of LTO data via broadcast GPS health model, in accordance with an embodiment of the invention.

FIG. 5 is an exemplary flow chart illustrating updating of LTO data via broadcast GPS health model, in accordance with an embodiment of the invention. Referring to FIG. 5, where the exemplary steps start with the step 502. In step 502, the GPS enabled handset 110, which may have received LTO data early and the received LTO data may be still valid, may receive broadcast navigation signals from the GPS satellites 120. In step 504, the GPS enabled handset 110 may be enabled to extract satellite health model from the received broadcast navigation signal, indicated by health_broadcast. In step 506, the LTO health model parameters may be adjusted based on health_broadcast, and go back to the step 502.

Aspects of a method and system for extending the usability period of long term orbit (LTO) are provided. In accordance with various embodiments of the invention, the GPS enabled handset 110 may receive LTO data, which may represent long term satellite tracking data, from the AGPS server 140. The received LTO data may be utilized for determining a navigation solution such as a fast position fix for the GPS enabled handset 110. The satellite tracking data may comprise the GPS ephemeris 200 which may provide predicted navigation information such as orbits model, clock model, and/or satellite health model.

The GPS front-end 304a may be enabled to receive broadcast GPS signals from the GPS satellite 120. The processor 306 may be capable of adjusting the received LTO data based on navigation information from the received broadcast GPS signals. The LTO data may be transmitted from the AGPS server 140 to the GPS enabled handset 110 via the wireless communication network 130 by using various technologies such as 3GPP, 3GPP Long Term Evolution (LTE), or WiMAX. The GPS enabled handset 110 may be enabled to extract navigation information from the received broadcast GPS signals. The usability period of the received LTO data may be extended based on the extracted navigation information. The extracted navigation information may comprise the latest GPS clock model and/or the latest satellite health model associated with the transmitting GPS satellites for the received broadcast GPS signals. The received LTO data may be adjusted based on the extracted GPS clock model and/or the extracted satellite health model, respectively. The extracted clock model may be used to update or replace the clock model of the LTO data. The extracted satellite health model may provide the latest satellite operation status to update the satellite health model of the LTO data. A navigation solution for the GPS enabled handset 110 may be determined more accurately based on the adjusted LTO data.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for extending the usability period of long term orbit (LTO).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
   receiving, from a server configured to provide assistance data, satellite tracking data at a remote receiver, wherein the satellite tracking data comprises one or more ephemeris models;
   receiving, directly from a satellite, a satellite broadcast signal at said remote receiver; and
   adjusting a model of said satellite tracking data based on said received satellite broadcast signal to extend the usability period of said model.

2. The method according to claim 1, comprising receiving, at said remote receiver, said satellite tracking data via one or more of a 3GPP signal, a 3GPP Long Term Evolution (LTE) signal, and a WiMAX signal.

3. The method according to claim 1, comprising extracting navigation information from said received satellite broadcast signal.

4. The method according to claim 3, comprising extending a usability period of said model of said satellite tracking data based on said extracted navigation information.

5. The method according to claim 3, wherein said extracted navigation information comprises satellite ephemeris and satellite health information.

6. The method according to claim 5, comprising adjusting said model of said satellite tracking data based on said satellite ephemeris.

7. The method according to claim 5, comprising adjusting said model of said satellite tracking data based on said satellite health information.

8. The method according to claim 5, comprising updating a clock model of said satellite tracking data based on said satellite ephemeris.

9. The method according to claim 5, comprising updating a satellite health model of said satellite tracking data based on said satellite health information.

10. The method according to claim 1, comprising determining a position fix based on said adjusted model of said satellite tracking data.

11. A system for wireless communication, the system comprising:
one or more processors operable to receive from a server configured to provide assistance data, satellite tracking data, wherein the satellite tracking data comprises one or more ephemeris models;
said one or more processors are operable to receive, directly from a satellite a satellite broadcast signal; and
said one or more processors are operable to adjust a model of said satellite tracking data based on said received satellite broadcast signal to extend a usability period of said model.

12. The system according to claim 11, wherein said one or more processors are operable to receive said satellite tracking data via one or more of a 3GPP signal, a 3GPP Long Term Evolution (LTE) signal, and a WiMAX signal.

13. The system according to claim 11, wherein said one or more processors are operable to extract navigation information from said received satellite broadcast signal.

14. The system according to claim 13, wherein said one or more processors are operable to extend a usability period of said model of said satellite tracking data based on said extracted navigation information.

15. The system according to claim 13, wherein said extracted navigation information comprises satellite ephemeris and satellite health information.

16. The system according to claim 15, wherein said one or more processors are operable to adjust said model of said satellite tracking data based on said satellite ephemeris.

17. The system according to claim 15, wherein said one or more processors are operable to adjust said model of said satellite tracking data based on said satellite health information.

18. The system according to claim 15, wherein said one or more processors are operable to update a clock model of said satellite tracking data based on said satellite ephemeris.

19. The system according to claim 15, wherein said one or more processors are operable to update a satellite health model of said satellite tracking data based on said satellite health information.

20. The system according to claim 11, wherein said one or more processors are operable to determine a position fix based on said adjusted model of said satellite tracking data.

* * * * *

UNITED STATES PATENT AND TRADEMARK OFFICE
CERTIFICATE OF CORRECTION

| | | |
|---|---|---|
| PATENT NO. | : 8,358,245 B2 | Page 1 of 1 |
| APPLICATION NO. | : 12/326465 | |
| DATED | : January 22, 2013 | |
| INVENTOR(S) | : Frank van Diggelen | |

It is certified that error appears in the above-identified patent and that said Letters Patent is hereby corrected as shown below:

Column 9, Line 16, please replace "a satellite a satellite" with --a satellite, a satellite--.

Signed and Sealed this
Nineteenth Day of March, 2013

Teresa Stanek Rea
*Acting Director of the United States Patent and Trademark Office*